US006980395B2

(12) United States Patent
Lille (10) Patent No.: US 6,980,395 B2
(45) Date of Patent: Dec. 27, 2005

(54) ENHANCED COPLANAR CONDUCTANCE STRUCTURE FOR INDUCTIVE HEADS

(75) Inventor: Jeffrey S. Lille, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 10/284,716

(22) Filed: Oct. 31, 2002

(65) Prior Publication Data

US 2004/0085673 A1 May 6, 2004

(51) Int. Cl.[7] ............................................. G11B 5/17
(52) U.S. Cl. ....................................................... 360/123
(58) Field of Search ........................ 360/123, 119, 110

(56) References Cited

U.S. PATENT DOCUMENTS

| | | | |
|---|---|---|---|
| 5,173,826 A | * 12/1992 | Bischoff | 360/126 |
| 5,989,623 A | 11/1999 | Chen et al. | 427/97 |
| 6,016,011 A | 1/2000 | Cao et al. | 257/773 |
| 6,037,001 A | 3/2000 | Kaloyeros et al. | 427/250 |
| 6,051,496 A | 4/2000 | Jang | 438/687 |
| 6,157,081 A | 12/2000 | Nariman et al. | 257/752 |
| 6,349,014 B1 | * 2/2002 | Crue et al. | 360/123 |

* cited by examiner

Primary Examiner—Julie Anne Watko
(74) Attorney, Agent, or Firm—Chambliss, Bahner & Stophel, P.C.; David W. Lynch (57) ABSTRACT

A high aspect ratio structure using topographical features to increase conformal coverage area provides high conductance. An insulation layer is disposed over a magnetic material. At least one trench is formed in the insulation layer to form a coil, where the at least one trench forms the coil with multiple coil windings. A plurality of topographical features is formed in at least one nonconfined area of the coil to increase conformal coverage area. A metal, such as copper, is deposited into the at least one trench and topographical features to form an inductive structure.

23 Claims, 12 Drawing Sheets

Fig. 8 where N=2,3,4,5,...

ENHANCED COPLANAR CONDUCTANCE STRUCTURE FOR INDUCTIVE HEADS

BACKGROUND OF THE INVENTION

1. Field of the Invention

This invention relates in general to magnetic transducers, and more particularly to a method and apparatus for forming a high conductance, high aspect ratio structure in a single low temperature copper chemical vapor deposition step.

2. Description of Related Art

Magnetic recording is a key and invaluable segment of the information-processing industry. While the basic principles are one hundred years old for early tape devices, and over forty years old for magnetic hard disk drives, an influx of technical innovations continues to extend the storage capacity and performance of magnetic recording products. For hard disk drives, the areal density or density of written data bits on the magnetic medium has increased by a factor of more than two million since the first disk drive was applied to data storage. Since 1991, areal density has grown by the well-known 60% compound growth rate, and this is based on corresponding improvements in heads, media, drive electronics, and mechanics.

Magnetic recording heads have been considered the most significant factor in areal-density growth. The ability of these components to both write and subsequently read magnetically recorded data from the medium at data densities well into the Gbits/in$^2$ range gives hard disk drives the power to remain the dominant storage device for many years to come.

A disk drive includes a rotating magnetic disk, write and read heads that are suspended by a suspension arm above the rotating disk and an actuator that swings the suspension arm to place the read and write heads over selected circular tracks on the rotating disk. The read and write heads are directly mounted on a slider that has an air bearing surface (ABS). The suspension arm biases the slider into contact with the surface of the disk, or a non-contact location, when the disk is not rotating. However, when the disk rotates, air is compressed by the rotating disk adjacent the ABS causing the slider to ride on an air bearing a slight distance from the surface of the rotating disk. The write and read heads are employed for writing magnetic impressions to and reading magnetic impressions from the rotating disk. The read and write heads are connected to processing circuitry that operates according to a computer program to implement the writing and reading functions.

Prior to 1991, heads were designed with a single inductive sensor performing both reading and writing functions. The decreasing signal amplitude resulting from areal densities exceeding 500 Mbits/in$^2$ promoted the development of magnetoresistive and giant-magnetoresistive read sensors merged with an inductive head, which now performed a write function only. While write track widths can be wider than the corresponding read widths, i.e. "write wide and read narrow", inductive sensors must be redesigned with narrower gaps and pole geometries. At these higher data densities, pole edge effects become more significant. Coil widths and numbers of turns, all attained by advanced photolithographic techniques over large topographies, must be optimized to achieve adequate inductance focused within a very small writing area on the medium. Finally, it is a consequence of increased areal density that the media or internal data rate, i.e. the rate at which information is written and read within a disk drive, is increased.

A write head includes a coil layer embedded in insulation layers (insulation stack), the insulation stack being sandwiched between first and second pole piece layers. A write gap layer between the first and second pole piece layers forms a magnetic gap at an air bearing surface (ABS) of the write head. The pole piece layers are connected at a back gap. Current conducted to the coil layer induces a magnetic field across the magnetic gap between the pole pieces. This field fringes across the magnetic gap for the purpose of writing information in tracks on moving media, such as the circular tracks on the aforementioned rotating disk or a linearly moving magnetic tape in a tape drive.

The drive for micro mechanical structures to consume less area demands high aspect ratios (height over width). The simplest illustration of this is the coil. To allow the same current to be passed through the coil the cross sectional area of the turns must be held constant. As the line width of the coil turns becomes smaller the height must increase to maintain the cross sectional area. Fabricating high aspect ratio copper coils, as used in the magnetic inductive write head, is becoming increasingly more difficult to create using tradition electroplating on top of a copper containing a seed layer. Further, it is difficult to use electroplating to produce a conformal seed layer that minimizes discontinuities. These seed layers are not always continuous or plating tends to produce voids in high aspect ration structures.

These coils were traditionally produced via plating through a resist mask over a full film copper seed layer where the seed layer would be physically removed in a later process. However, removal of the seed has become difficult with sub-micron spacing between the coils. Thus, an alternate method is to use a damascene process to produce the coils. Nevertheless, this process is dependent on seed layer, plating without voids, and planarization of the wafer.

It can be seen that there is a need to introduce a structure or mechanism that maintains a void free deposition of a conductive material to increase conductance of a coil structure.

SUMMARY OF THE INVENTION

To overcome the limitations in the prior art described above, and to overcome other limitations that will become apparent upon reading and understanding the present specification, the present invention discloses a method and apparatus for forming a high conductance, high aspect ratio structure in a low temperature copper chemical vapor deposition step.

The present invention solves the above-described problems by providing topographical features in an inductive head structure that includes an insulation layer over a magnetic material, wherein at least one trench is formed in the insulation layer to form a coil, wherein the at least one trench forms multiple coil windings. The topographical features are formed in at least one nonconfined area of the coil to increase surface area, and a metal is deposited into the at least one trench and topographical features in a single step to form a conductive coating to create a higher conductance in the nonconfined area.

A method in accordance with the principles of the present invention includes providing an insulation layer over a magnetic material, forming trenches in the insulation layer to form a coil, forming topographical features in at least one nonconfined area of the coil to increase conformal coverage area and depositing a metal into the trenches and topographical features to form an inductive structure.

In another embodiment of the present invention, an inductive head structure using topographical features includes an insulation layer disposed over a magnetic material, at least one trench formed in the insulation layer to form a coil, wherein the at least one trench forms multiple coil windings, topographical features formed in at least one nonconfined area of the coil to increase conformal coverage area and a metal deposited into the at least one trench and topographical features to form an inductive structure.

In another embodiment of the present invention, a magnetic storage device includes magnetic media for storing data thereon, a motor for translating the position of the magnetic media and an actuator for positioning an inductive head structure, wherein the inductive head structure includes an insulation layer providing over a magnetic material, at least one trench formed in the insulation layer to form a coil, wherein the at least one trench forms multiple coil windings, topographical features formed in at least one nonconfined area of the coil to increase conformal coverage area and a metal deposited into the at least one trench and topographical features to form an inductive structure.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings, which form a part hereof, and in which is shown by way of illustration the specific embodiment in which the invention may be practiced. It is to be understood that other embodiments may be utilized as structural changes may be made without departing from the scope of the present invention. Although the drawings are intended to illustrate the present invention, the drawings are not necessarily drawn to scale.

The present invention forms a high conductance, high aspect ratio structure in a single low temperature copper chemical vapor deposition step. The present invention uses a low temperature, conformal coverage copper chemical vapor deposition technique that includes topographical features to increase a conformal coverage area. Multiple coil trenches are created in nonconfined areas of a coil structure and these multiple coil trenches also create a lower resistance in the coil windings, and thus, higher conductivity. The term confined areas herein will be used to refer to areas within a yoke region and the term nonconfined areas herein will be used to refer to areas not within a yoke region. Coil windings in the nonconfined areas have substantially the same pitch as found in the confined areas. Coil windings are located between insulation layers, which are referred to as the insulation stack, and the coil windings and the insulation layers are located between pole piece layers. Refer now to the drawings wherein depicted elements are not necessarily shown to scale.

Figure 1:
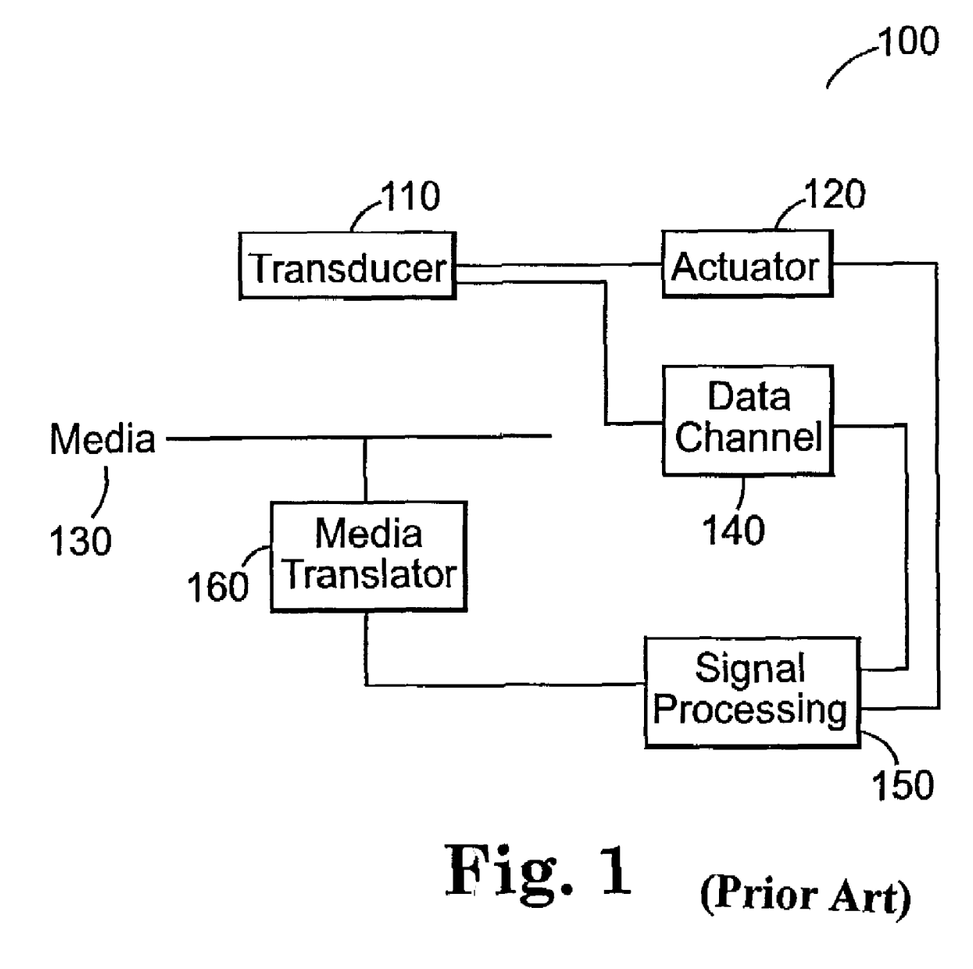
FIG. 1 illustrates a storage system according to the present invention.

FIG. 1 illustrates a storage system 100 according to the present invention. In FIG. 1, a transducer 110 is under control of an actuator 120. The actuator 120 controls the position of the transducer 110. The transducer 110 writes and reads data on magnetic media 130. The read/write signals are passed to a data channel 140. A system processor 150 controls the actuator 120 and processes the signals of the data channel 140. In addition, a media translator 160 is controlled by a signal processor 150 to cause the magnetic media 130 to move relative to the transducer 110. The present invention is not meant to be limited to a particular type of storage system 100 or to the type of media 130 used in the storage system 100.

Figure 2:
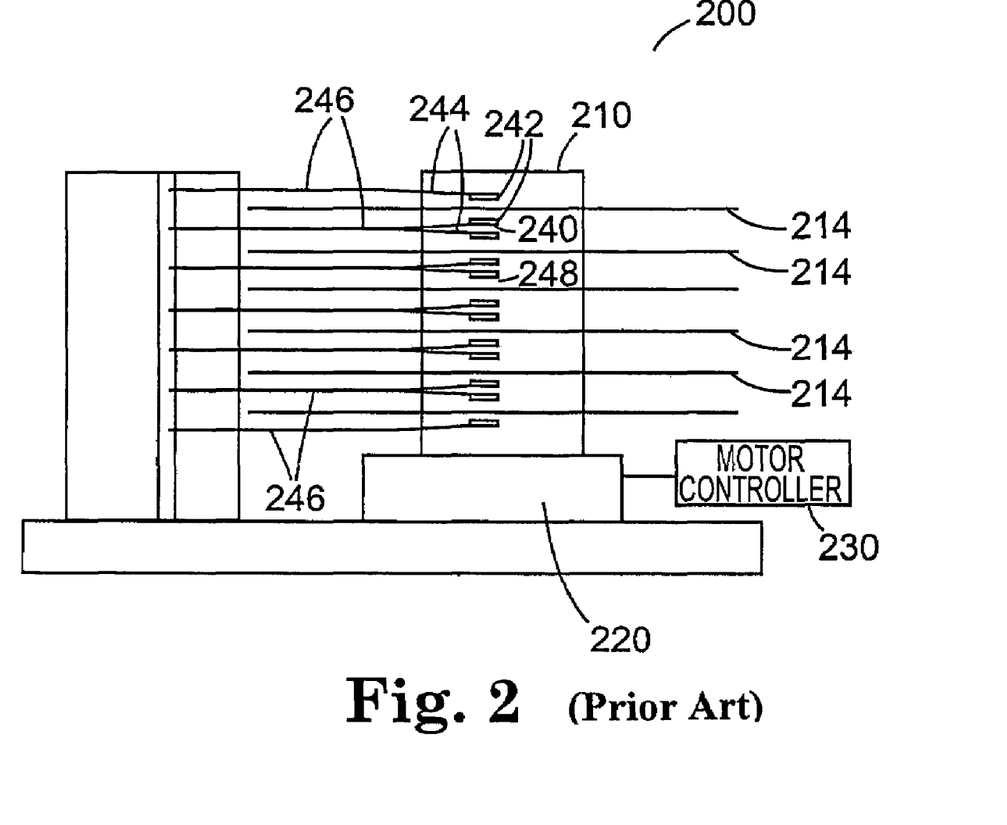
FIG. 2 illustrates one particular embodiment of a storage system according to the present invention.

FIG. 2 illustrates one particular embodiment of a storage system 200 according to the present invention. In FIG. 2, a hard disk drive 200 is shown. The drive 200 includes a spindle 210 that supports and rotates a magnetic disk 214. The spindle 210 is rotated by a motor 220 that is controlled by a motor controller 230. A combined read and write magnetic head 240 is mounted on a slider 242 that is supported by a suspension 244 and actuator arm 246. Processing circuitry (not shown) exchanges signals, representing such information, with the head 240, provides motor drive signals for rotating the magnetic disk 214, and provides control signals for moving the slider to various tracks. A plurality of disks 214, sliders 242 and suspensions 244 may be employed in a large capacity direct access storage device (DASD).

The suspension 244 and actuator arm 246 position the slider 242 so that the magnetic head 240 is in a transducing relationship with a surface of the magnetic disk 214. When the disk 214 is rotated by the motor 220 the slider 240 is supported on a thin cushion of air (air bearing) between the surface of the disk 214 and the air bearing surface (ABS) 248. The magnetic head 240 may then be employed for writing information to multiple circular tracks on the surface of the disk 214, as well as for reading information therefrom.

Figure 3:
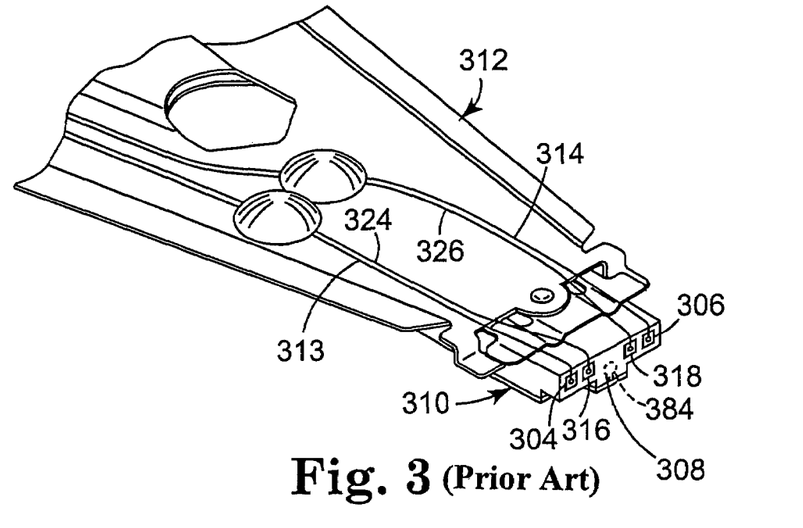
FIG. 3 illustrates a slider mounted on a suspension.

FIG. 3 illustrates a slider 310 mounted on a suspension 312. In FIG. 3 first and second solder connections 304 and 306 connect leads from the sensor 308 to leads 313 and 314 on the suspension 312 and third and fourth solder connections 316 and 318 connect the coil 384 to leads 324 and 326 on the suspension. However, the particular locations of connections may vary depending on head design.

Figure 4:
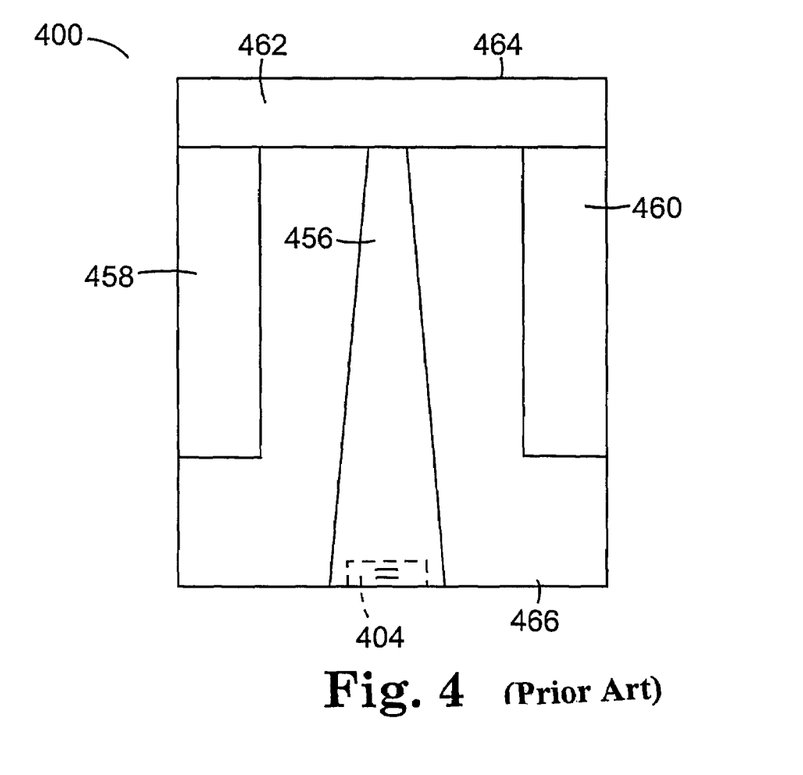
FIG. 4 is an ABS view of the slider and the magnetic head.

FIG. 4 is an ABS view of the slider 400 and the magnetic head 404. The slider has a center rail 456 that supports the magnetic head 404, and side rails 458 and 460. The rails 456, 458 and 460 extend from a cross rail 462. With respect to rotation of a magnetic disk, thee cross rail 462 is at a leading edge 464 of the slider and the magnetic head 404 is at a trailing edge 466 of the slider. However, the rail configuration illustrated in FIG. 4 is presented as one example and the present invention is not meant to be limited to the particular rail configuration shown in FIG. 4.

Figure 5:
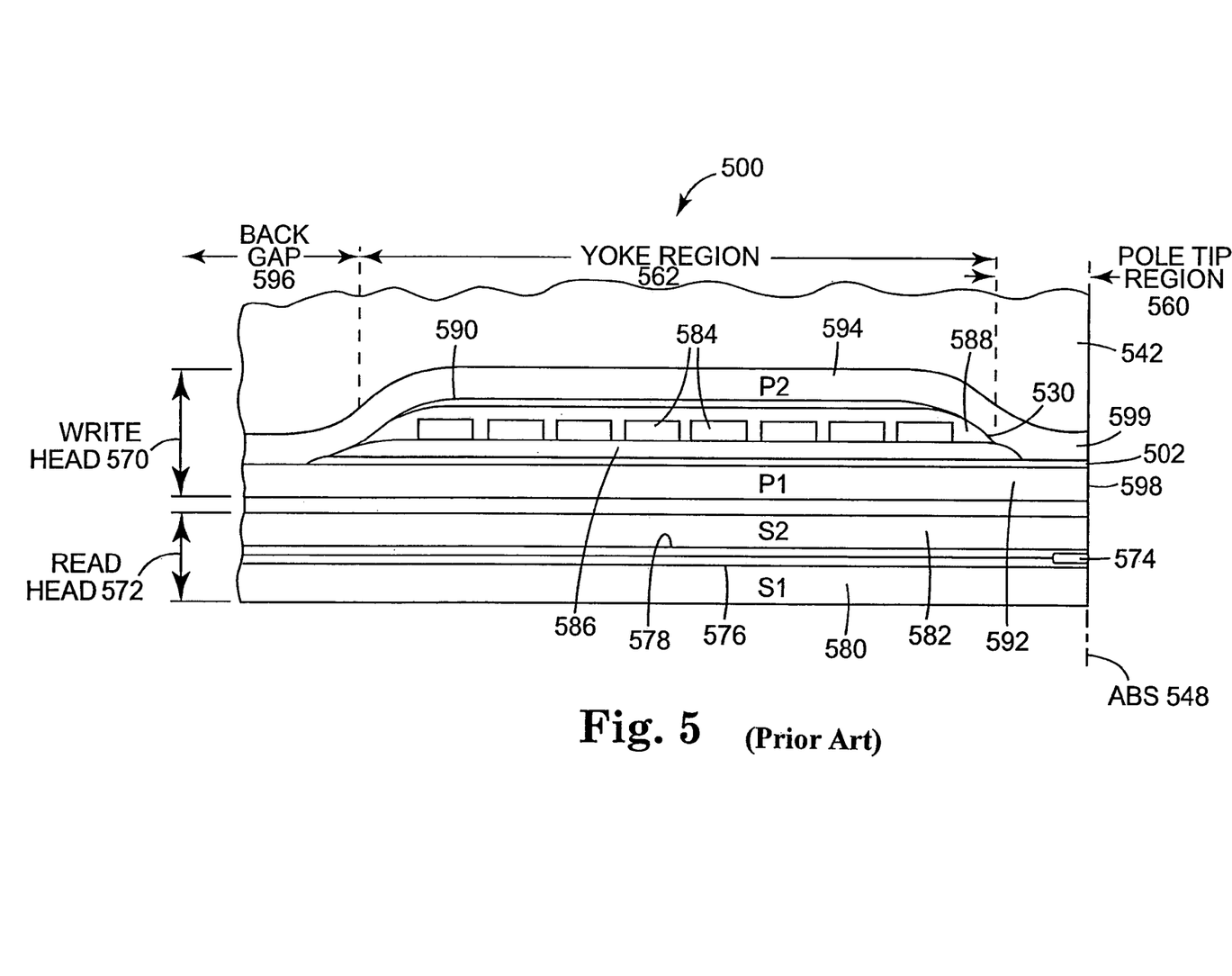
FIG. 5 is a side cross-sectional elevation view of a merged MR or spin valve head, which has a write head portion and a read head portion, the read head portion employing an MR or spin valve sensor.

FIG. 5 is a side cross-sectional elevation view of a read/write head 500 which has a write head portion 570 and a read head portion 572, the read head portion 572 employing an MR or spin valve sensor 574. The head portion 572 of the merged head includes a coil layer 584 located between first and second insulation layers 586 and 588. A third insulation layer 590 may be employed for planarizing the head to eliminate ripples in the second insulation layer caused by the coil layer 584. The first, second and third insulation layers 586, 588, 590 are referred to in the art as an "insulation stack". The coil layer 584 and the first, second and third insulation layers 586, 588 and 590 are located between first and second pole piece layers 592 and 594. The first and second pole piece layers 592 and 594 are magnetically coupled at a back gap 596 and have first and second pole tips 598 and 599 which are separated by a write gap layer 502 at the ABS 548. The sensor 574 is located between first and second gap layers 576 and 578 and the gap layers are located between first and second shield layers 580 and 582. The head 500 is mounted on a slider 542. A wear layer (not shown) may be employed for protecting the sensitive elements of the magnetic head.

In FIG. 5, the read/write head 500 has a pole tip region 560 and a yoke region 562, the merging of these components being defined by a flare point 530, which is the location where the second pole piece layer 594 begins to bend as it recesses in the head 500. The pole tip region extends from the ABS 548 to the flare point 530, and the yoke region extends from the flare point 530 to the back gap 596. It should be noted that a merged head employs a single layer to serve a double function as a second shield layer 582 for the read head and as a first pole piece 592 for the write head, whereas a piggyback head 500, as illustrated in FIG. 5, employs two separate layers for these functions.

Figure 6:
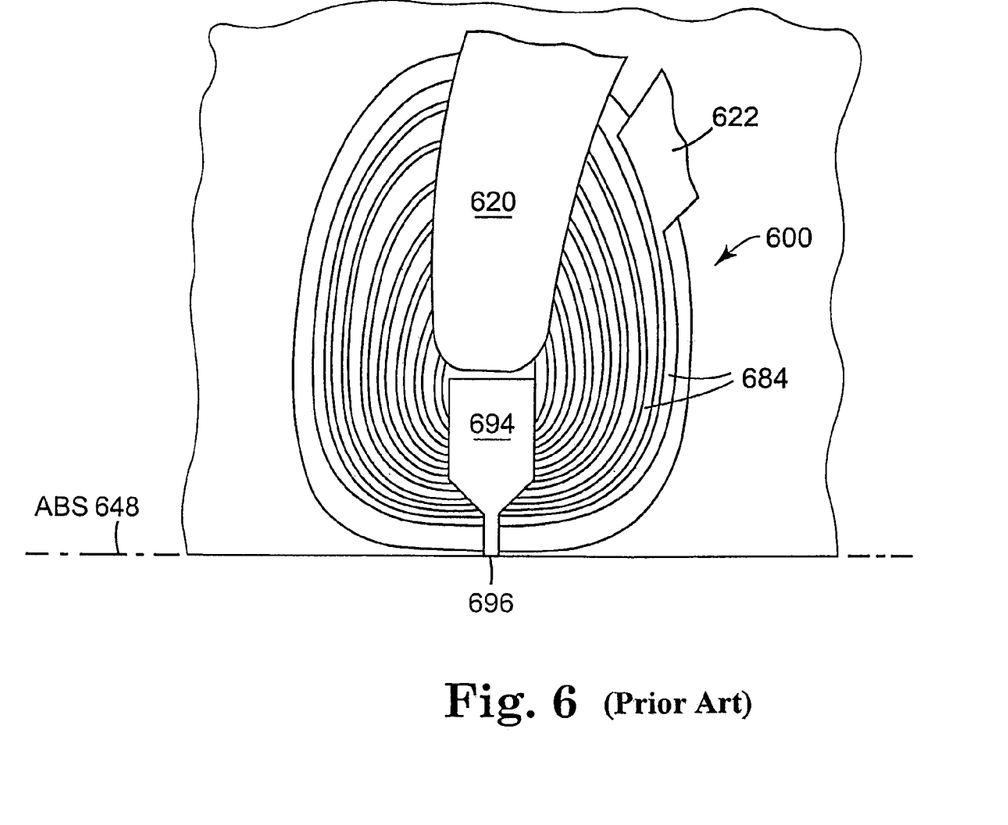
FIG. 6 is a view of a coil with all material above the coil layer and leads removed according to the present invention.

FIG. 6 is a general view of a coil 600 with all material above the coil layer and leads removed. As shown in FIG. 3, the third and fourth solder connections 316 and 318 connect leads 620 and 622 from the coil layer 684 to leads 324 and 326 on the suspension, respectively. The second pole piece 694 extends over the coil layer 684 at a pole tip region 696. A wear layer (not shown) protects the sensitive elements of the magnetic head at the air bearing surface 684.

Figure 7:
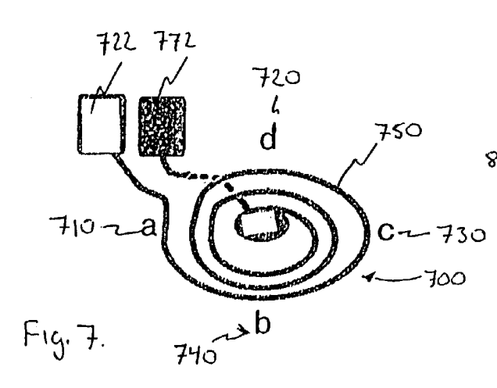
FIG. 7 illustrates a coil according to the present invention.

FIG. 7 illustrates a coil 700 according to the present invention. Lithographic areas not found in the yoke region are referred to as nonconfined areas. As shown in FIG. 3, the third and fourth solder connections 316 and 318 connect leads 722 and 772 from the coil windings 750 to leads 324 and 326 on the suspension. The pitch of the coil windings 750 in the nonconfined areas 710, 720, 730 are equal or greater than those found in a confined area 740 in the yoke region. The nonconfined areas 710, 720, 730 that provide an equal or greater pitch between the coil windings 750 may cause an irregular topology. As defined above, the term confined areas refers to areas within a yoke region and the term nonconfined areas refers to areas not within a yoke region.

Figure 8:
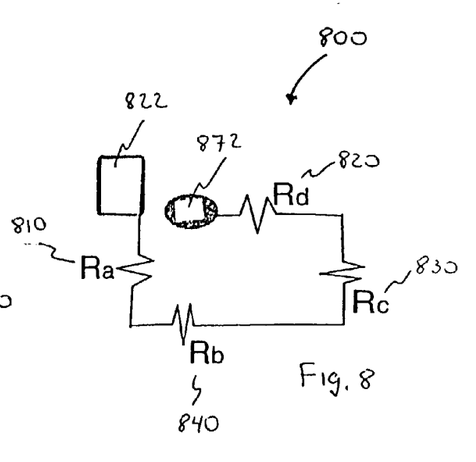
FIG. 8 illustrates the resistance in a single turn of a coil that is formed without using an enhanced coplanar conductance structure.

FIG. 8 illustrates the resistance in a single turn of a coil that is formed without using an enhanced coplanar conductance structure 800. As shown in FIG. 3, the third and fourth solder connections 316 and 318 connect leads 822 and 872. The nonconfined areas, which are areas not found in the yoke region, include resistive sections Ra 810, Rd 820, and Rc 830. The confined area Rb 840 is the resistive portion of the coil found under the yoke 694 region. The confined and nonconfined areas that form a coil without using an enhanced coplanar conductance structure, according to the present invention, have similar resistances.

Figure 9:
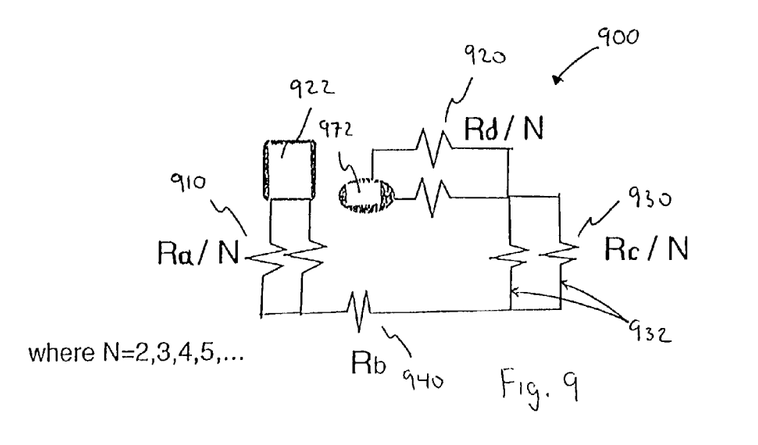
FIG. 9 illustrates the resistance in a single turn of a coil that formed using an enhanced coplanar conductance structure according to the present invention.

FIG. 9 illustrates the resistance in a single turn of a coil that has been formed using an enhanced coplanar conductance structure 900 according to the present invention. As will be discussed in more detail below, multiple coil windings 932 are formed in the nonconfined areas 910, 920, 930 providing nearly the same pitch as that found in the yoke region (confined area 940). The multiple (e.g. N=2, 3, 4, 5 . . . ) coil windings 932 create topographical features, which increase the conductance of the structures as well as increasing conformal coverage. Parallel wires are symbolically shown in FIG. 9 as two resistors in parallel (i.e., N=2) for a portion of a coil. This reduces the resistance for that portion by a factor of N where both wires in this portion are identical. In any case, the resistance is decreased with more parallel wires. The third and fourth solder connections 316 and 318 connect leads 922 and 972. The nodes between the confined different regions of the coil are symbolic for the coil may gradually change dimensions and conductivity in different regions.

Figure 10:
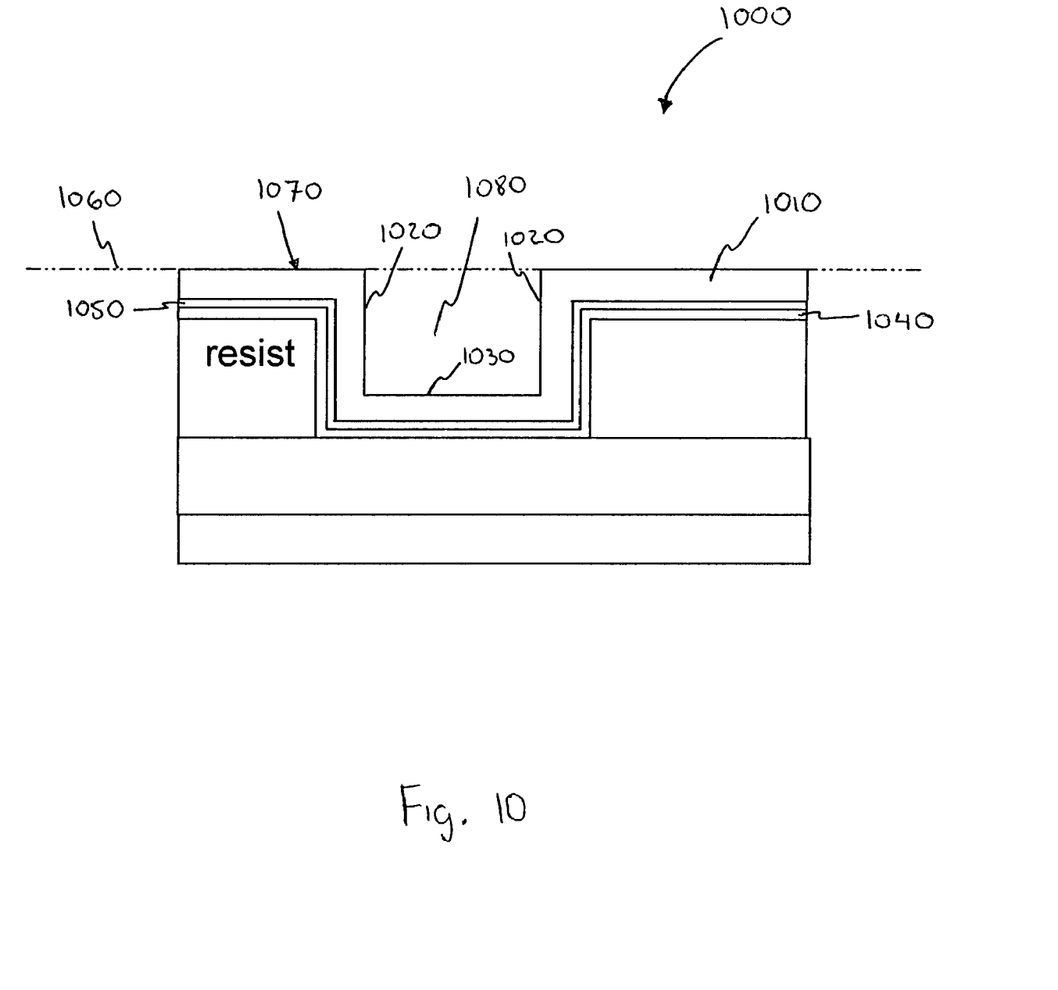
FIG. 10 illustrates an etched trench for a chemical vapor deposition metal without an increased conductance structure according to the present invention.

FIG. 10 illustrates an etched trench for a chemical vapor deposition metal without an increased conductance structure 1000 according to the present invention. Conformal coverage will exist, for example, when a metal 1010, such as copper, is evenly distributed over a surface. This metal may be distributed evenly over surfaces by vacuum deposition processes, such as chemical vapor deposition (CVD), or sputtering. Further, CVD metals improve step coverage and reduce overhang (the amount of material deposited at the top of a feature 1070, which limits the amount of material that can be deposited within a trench 1080 (or via)).

Barrier and seed layers may be formed to prevent intermixing of the layers above and below them. The barrier layer 1040 and the seed layer 1050 may be formed by plating and planarization process or by CVD. Nevertheless, a conformal CVD layer formed over the barrier 1040 or seed 1050 layers can minimize discontinuities in the barrier 1040 and seed 1050 layers allowing metal to migrate into the dielectric and fill voids.

Conductive layers (including seed layers 1050) such as copper, typically require a continuous film to carry current for processes such as electroplating. This demands adequate sidewall 1020 and bottom 1030 coverage in very small dimension in structures such as damascene structures. The aspect ratio of a structure is the height of the structure compared with the width of the structure. Increasing aspect ratios (e.g., >3/1, depth/width as seen in cross-section) may decrease copper thickness inside the feature 1000, for example on vertical walls 1020. These aspect ratios of 3/1 or greater may also result in incomplete copper depositions or voids in the coil (when viewed in cross-section).

In depositing a seed layer, neither a collimated vacuum deposition nor a chemical vapor deposition forms a planar surface 1060, as shown in FIG. 10, but simply provides conformal coverage, i.e., an even thickness on each surface 1070, 1020, 1030 of the trench 1080, maintaining the trench-like form of the structure 1000. However, a thin layer alone will not deposit enough copper to create enough conductivity to make an effective wire of inductive coil.

Figure 11A:
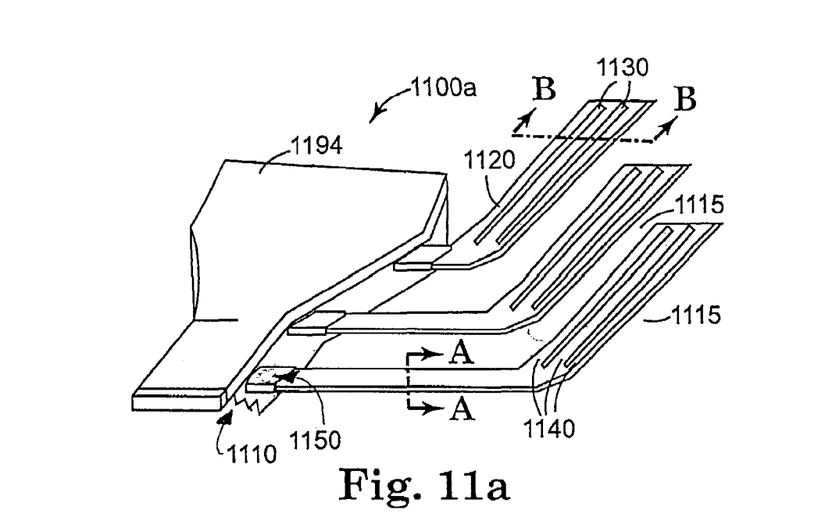
FIG. 11a illustrates the formation of topographical features in areas of a coil for increasing conformal coverage according to the present invention.

To these ends, FIG. 11*a* illustrates the formation of topographical features in areas of a coil 1100*a* for increasing conformal coverage according to the present invention. The second pole portion 1194 covers the confined area or yoke region 1110. Coil windings 1120 of a coil layer, similar to the coil layer 584 in FIG. 5, which are in the nonconfined region, are created with topographical features 1130 to increase metal chemical vapor coverage. This increases the amount of copper per cross-sectional area on the coil layer. A process, such as a damascene process, may form the topographical features 1130 by creating multiple trenches 1140. Further, the resist 1115 substantially surrounding the trenches may also form additional topographical features. However, the formation of topographical features 1130 can be accomplished by a plurality of techniques and is not limited to the damascene process.

Figure 11B:
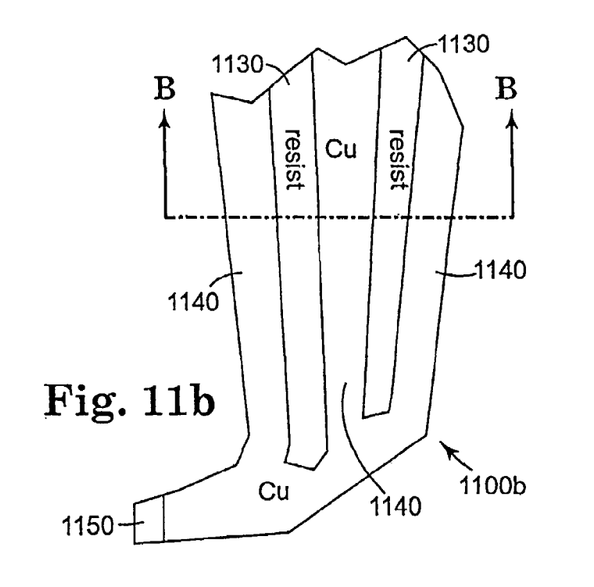
FIG. 11b is a magnified view of a portion of a single coil winding according to the present invention.

FIG. 11*b* is a magnified view of a portion of a single coil winding 1100*b* according to the present invention. FIG. 11*b* shows the topographical features 1130 may be formed by creating multiple trenches 1140 in the area not under the yoke, wherein the width of each trench is substantially similar to the width of the trench 1150 under the yoke 1194.

Figure 12:
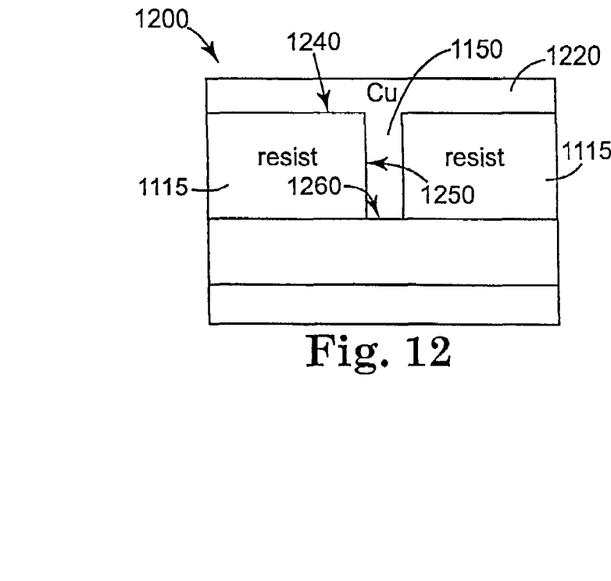
FIG. 12 illustrates a cross-section area A—A of a coil winding in the yoke region prior to planarization according to the present invention.

To further show how the coil may appear under a yoke structure, FIG. 12 illustrates a cross-section area A—A of a coil winding in the yoke region prior to planarization 1200 according to the present invention. A high aspect ratio structure, such as a coil structure, may be formed in a yoke region by a process such as a damascene process. The etched trench 1150 formed in a resist 1115 is filled with a metal, such as copper. The process to fill the trench 1150 may be a chemical vapor deposition process.

In one embodiment, chemical vapor deposition forms a film 1220 on surfaces 1240, 1250, 1260 from a volatile precursor (vapor or gas—not shown), as a consequence of one or more chemical reactions, which change the state of the precursor. Many different films 1220 can be deposited: elements and compounds, crystalline, polycrystalline, and amorphous. Most films 1220 can be deposited from several different precursor systems. For example, plasma discharges can be used to assist the deposition of metal, or the substrate and/or the gas can be heated or cooled.

Different deposition techniques, process conditions, and treatment after deposition produce films 1220 with differing characteristics, suitable for different applications. Each film 1220 has an optimal set of characterization techniques. As in one embodiment, CVD processes provide a volatile precursor containing the constituents of the film 1220, transport that precursor to the deposition surfaces 1240, 1250, 1260 to encourage or avoid reactions in the gas phase, encourage surface 1240, 1250, 1260 reactions that form the film 1220, and do it rapidly and reproducibly.

However, as discussed above, locations in nonconfined areas (i.e., not under, for example, the second pole piece 1194, in the yoke region 1110 of FIG. 11*a*), due to the pitch of coil windings or other variations in a coil structure, may cause irregular or non-planar surfaces. These areas will have less copper deposition per unit area.

Figure 13A:
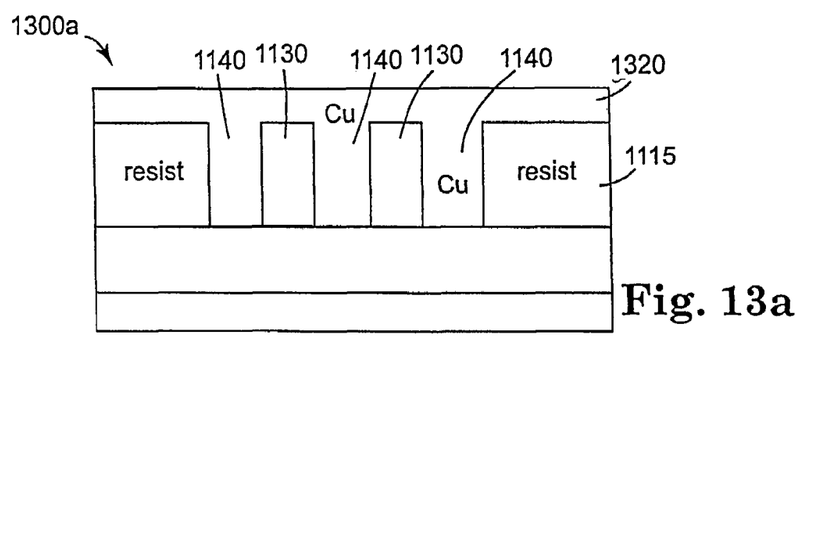
FIG. 13a illustrates a cross-sectional area B—B of a coil winding in a nonconfined area prior to planarization according to the present invention.

To show how one could deposit more copper per unit area, FIG. 13*a* illustrates a cross-sectional area B—B of a coil winding in a nonconfined area prior to planarization 1300*a* according to the present invention. A high aspect ratio structure, such as a coil structure, may be formed in the nonconfined areas (not in the yoke region) by a process such as a damascene process. Topographical features 1140 are formed to increase conformal coverage using a low temperature, conformal coverage chemical vapor deposition technique, for example, a copper CVD technique.

In one embodiment, the multiple etched trenches 1140 are formed in a resist 1115, 1130 to create topographical features. The trenches 1140 are then filled with a metal 1320, such as copper. The process to fill the trenches 1140 may be a chemical vapor deposition process. By increasing the coverage area in the nonconfined lithographic areas 1300*a*, the increased coverage will deposit more copper in the multiple trenches 1140 and hence increase conductance by effectively making multiple wires in parallel. This is shown as wires (coil windings 1120—FIG. 11) that would not be in the yoke region 1110 of a magnetic inductive writing head.

The multiple trenches 1140 create multiple coil windings (see 932—FIG. 9) that would have nearly the same pitch found in the yoke region. This is illustrated in the coil circuit diagram of FIG. 9. Further, due to the creation of multiple wires 932 (by the multiple trenches 1340) in the basic coil structure 900, different points in the coil 910, 920, 930, 940 thus have different resistances. Accordingly, a lower resistance is created in the nonconfined areas 910, 920, 930 containing multiple wires 932 (multiple trenches 1340), because these multiple wires 932 are in parallel.

Figure 13B:
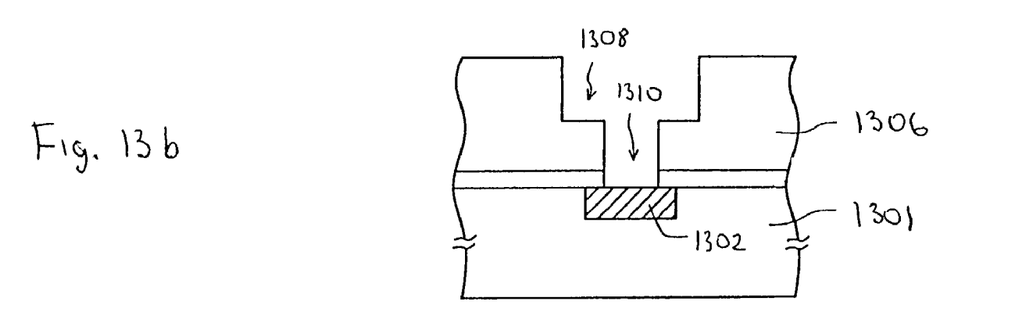
FIGS. 13b through 13d are cross-sectional views showing a method of fabricating a dual damascene structure according to the present invention.
Figure 13C:
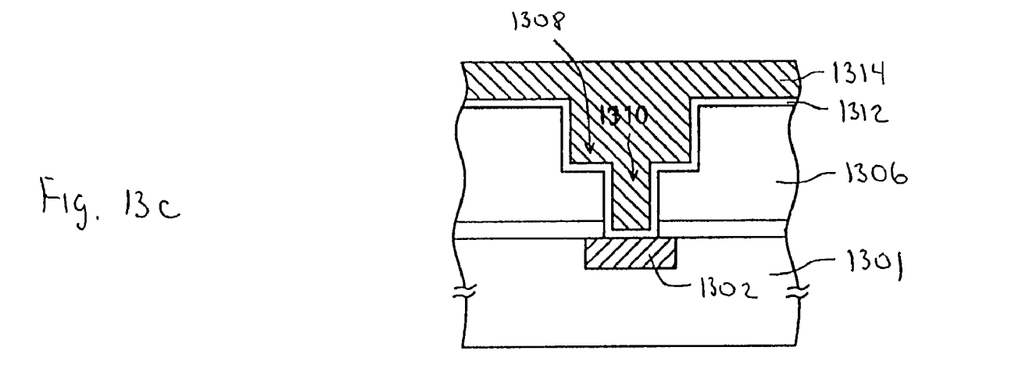
Figure 13D:
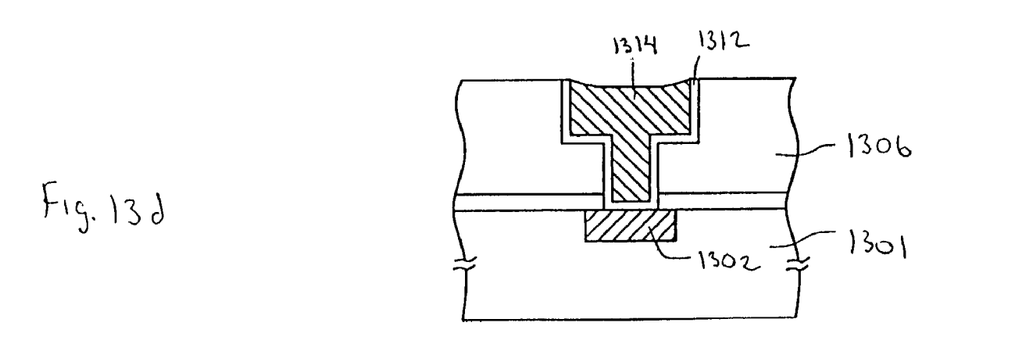

FIGS. 13*b* through 13*d* are cross-sectional views showing a method of fabricating a dual damascene structure. A dual-damascene technique is another method of forming trenches according to the present invention. It is a technique that forms a metallic interconnection 1314 (FIG. 13*c*) in a dielectric layer 1306. In FIG. 13*c*, a dielectric layer 1306 is first formed over a substrate 1301, and then the dielectric layer 1306 is planarized (FIG. 13*d*). According to the required design, the dielectric layer 1306 is then patterned. A trench 1308 and a via hole 1310 are formed to expose a portion of the conductive layer 1302. In FIG. 13*c*, a barrier layer 1312 may be formed over the substrate 1301. A copper layer 1314 is formed over the substrate 1301 to fill the trench 1308 and the via hole 1310. A conductive line and a via contact are thus simultaneously formed. As shown in FIG. 13d, a chemical-mechanical polishing (CMP) step is performed.

Figure 13E:
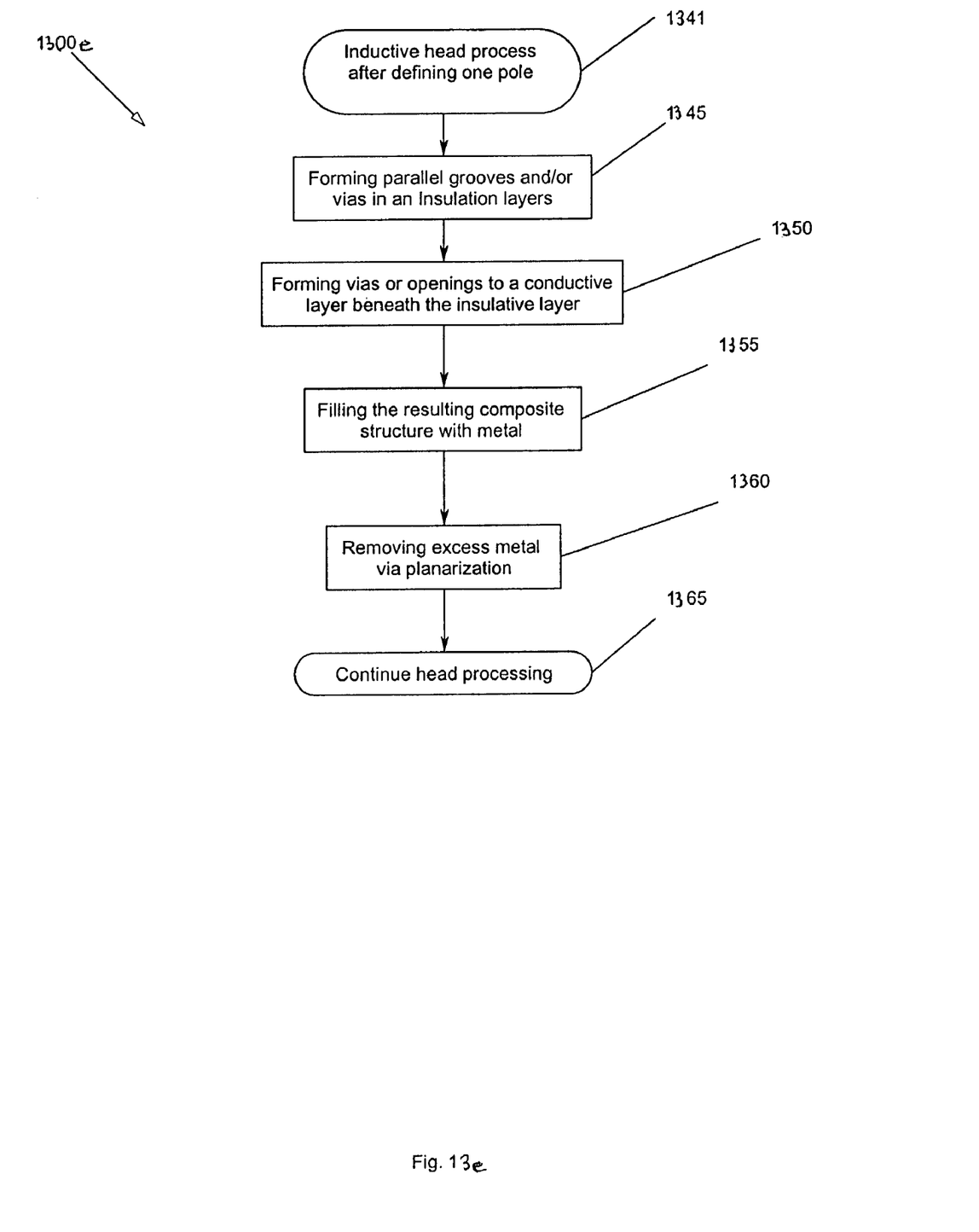
FIG. 13e is a flow chart of a process for creating topographical features using a damascene process as described in FIGS. 13b–d according to the present invention.

FIG. 13e is a flow chart of a process for creating topographical features using a damascene process 1300e as described in FIGS. 13b–d according to the present invention. This process, for example, would be used in a head fabrication process at a point where the inductive head is partially fabricated 1341. In one embodiment, in a single damascene process, grooves are formed in an insulating layer and filled with metal to form conductive windings 1345. Dual damascene takes the process one step further in that, in addition to forming the grooves of a single damascene, the conductive hole openings are also formed in the insulating layer 1350 to expose conductive layers that lie below the insulating layer. However, the creation of vias is optional to this process step 1350 and may be omitted. The resulting composite structure of grooves and holes are filled with metal 1355. The excess metal is then removed by planarization 1360. The process may be repeated to form the multi-level interconnections between metal windings and the holes. Once the trenches (and vias) are filled and electrically isolated, the head fabrication may proceed 1365.

It will be noted that the sequence of first forming the groove in an upper insulating layer and then a hole in an underlying lower insulating layer can be reversed by forming a hole or trench extending downwardly from the upper insulating layer to the bottom of a lower insulating layer and then "enlarging" or widening the hole or trench in the top layer to form a groove in the upper layer. Though each of the two approaches requires modification of some of the steps up to, but not including the last step of polishing 1360, the details of the intermediate steps will not be given here so as to not obscure the understanding of the important step of planarization. Thus, the narrow trench windings would be filled in the same copper CVD step 1355 and electrically separated in a damascene process 1345.

Figure 14:
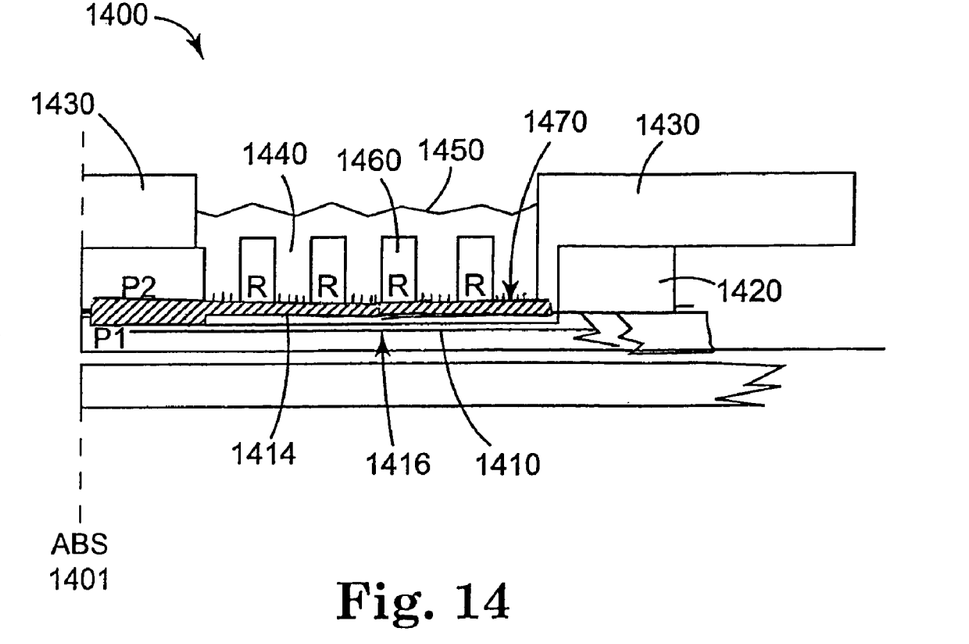
FIG. 14 illustrates a single masking of coils using topographical features for increasing conductance according to the present invention.

FIG. 14 illustrates a single masking of coils using topographical features for increasing conductance 1400 according to the present invention. The magnetic material 1410 may form, for example, a first pole in an inductive head. An insulation layer 1416 disposed over the magnetic material 1410. The magnetic material 1410 forming the pole may be covered with an insulator, such as SiO$_2$ or resist. On top of the insulation layer 1416, a seed layer 1470 material and/or barrier layer 1414 may be disposed over the magnetic material 1410 and insulation layer 1416.

Prior to the chemical vapor deposition, the pole piece P2 and backgap 1420 is covered with a mask 1430. Then, the chemical vapor deposition of a metal 1450, for example copper, in the trenches 1440 is accomplished. In a preferred embodiment, by using a single low temperature chemical vapor deposition process, a coil structure 1400 is formed. The topographical features created by trenches 1440 in the insulation 1460 determine the aspect ratio of the coils 1440 formed by a process such as a damascene process. The edge of the pole pieces will be defined by the location of the air bearing surface (ABS) 1401. This surface is defined at a later point and is represented as a dotted line.

Figure 15:
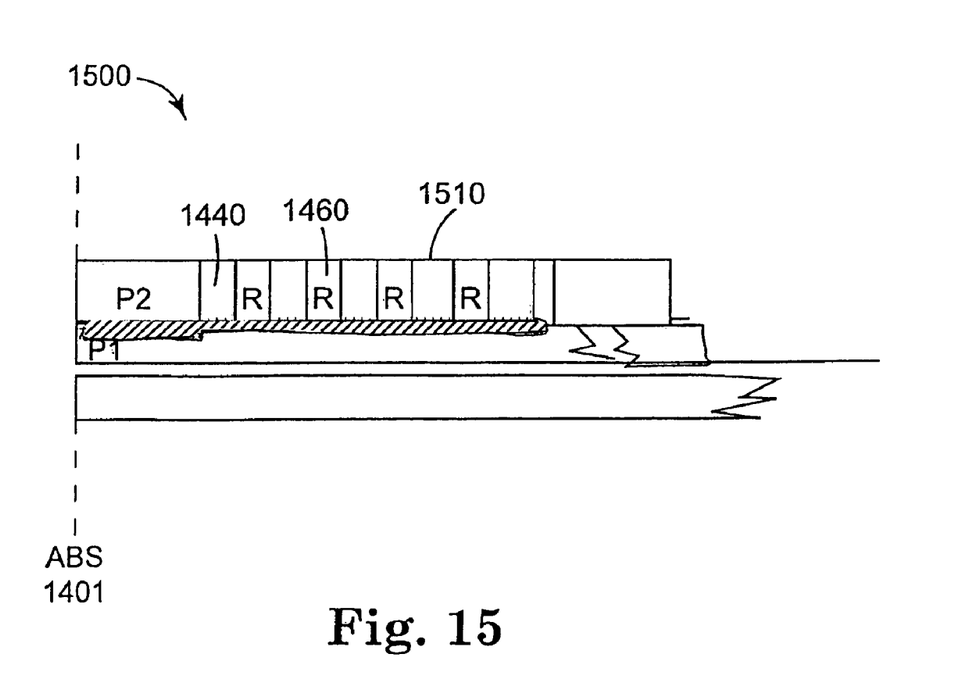
FIG. 15 is a view of the coils of FIG. 14 after chemical mechanical planarization of the single masked coils using topographical features according to the present invention.

FIG. 15 is a view of the coils of FIG. 14 after a chemical mechanical polishing of the single masked coils using topographical features 1500 according to the present invention. After the chemical vapor deposition process, the over-deposited coil (1450—FIG. 14) is planarized to a relatively smooth surface 1510, which defines the top of the coils 1440. An alternate method for creating the coils 1440 is to under-deposit the coils 1440 below thickness of the insulator 1460. The insulator 1460 would subsequently encapsulate the coil structure 1500 formed by the trenches 1440. This encapsulation would be accomplished by an additional photolithography step to cover the coils prior to planarization. This shows the coil structure coplanar with the pole tip (P2) in FIG. 15. In fact, the coil could be coplanar with the lower pole piece (P1), or under a magnetic yoke stitch structure which connects the back gap with a pole piece, or some combination of these. This depends on write head design.

Accordingly, the method of coil fabrication in the present invention requires no seed layer removal. The present invention thus alleviates the problems associated with complete ion removal of the seed layer between high aspect ratio coils. Also, the present invention is not prone to plating non-uniformities (voids), and is not subject to seed layer undercutting in a wet etch step process. This last point may be even more uncontrollable as the coil aspect ratios increase or the coil pitch decreases. Further, the present invention overcomes the difficulties of creating high aspect ratio coils, as used in magnetic heads, using traditional electroplating on top of a seed layer containing copper.

Figure 16:
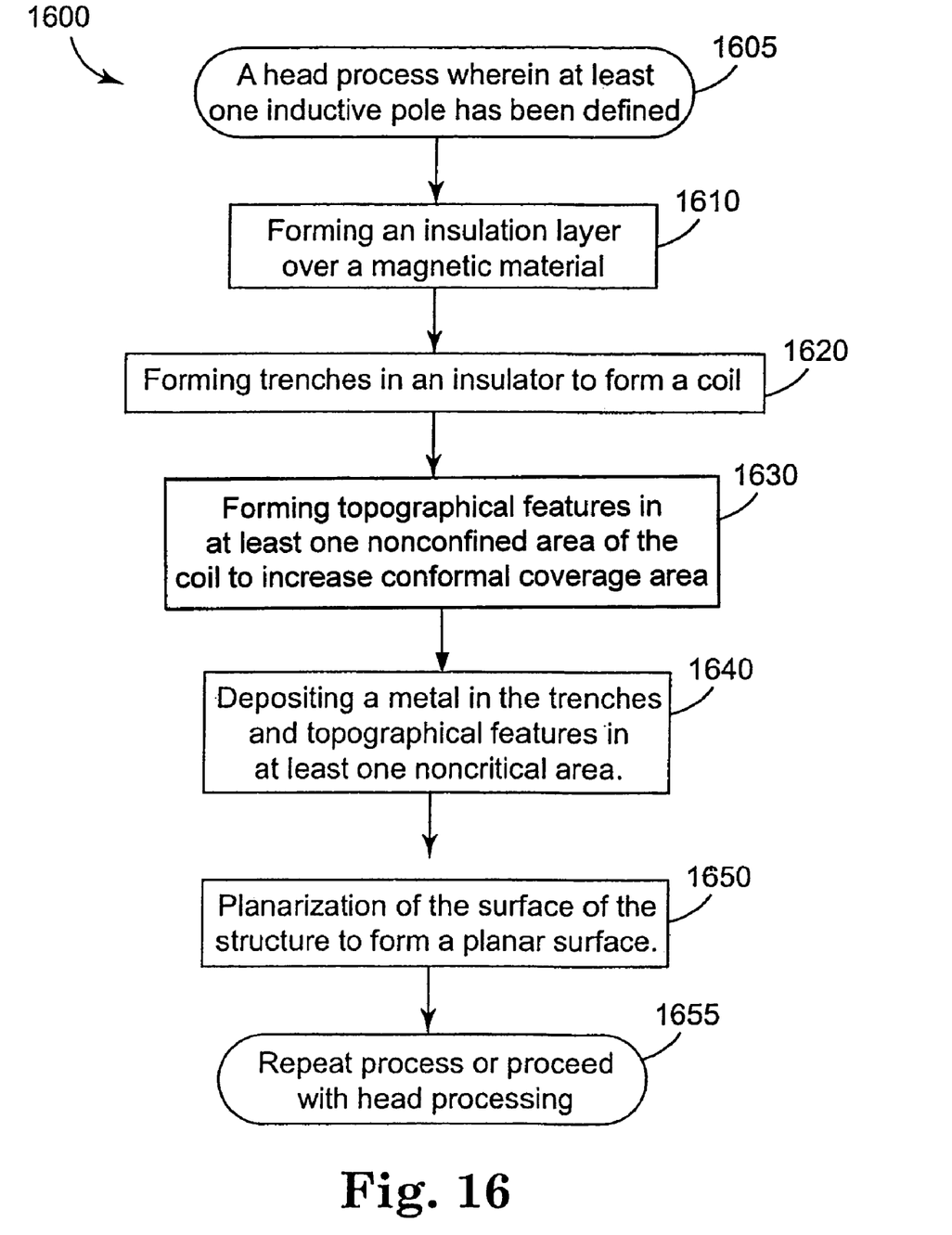
FIG. 16 is a flow chart of a process for creating topographical features for increasing the coverage area of nonconfined lithographic areas according to the present invention.

FIG. 16 is a flow chart 1600 of a process for creating topographical features for increasing the coverage area of nonconfined lithographic areas according to the present invention. This process would occur in an intermediate point in the head fabrication process 1605. In FIG. 16, an insulation layer is formed where a portion of the insulation is over a magnetic material 1610. Trenches are formed in the insulation layer to form a coil 1620. Topographical features are formed in at least one nonconfined area of the coil to increase conformal coverage area 1630. The forming of trenches 1620 and the topographical features (e.g., additional trenches) 1630 can be accomplished in the same etch process step. This could be followed by a gaseous compound deposited in a single step into the trenches and topographical features to form an inductive structural coating, creating a higher conductance in the at least one nonconfined area 1640. This deposition can also be accomplished by other vacuum deposition processes. One of ordinary skill in the art realizes that the process can be performed multiple times, creating for example, a multiple layer coil in the yoke region. Planarization of the surface of the structure forms a coplanar surface with the coil 1650. After the coil layer is complete, the head processing would continue 1655.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An inductive head structure using topographical features, comprising:
   an insulation layer disposed over a magnetic material;
   at least one trench formed in the insulation layer to form a coil, wherein the at least one trench forms the coil with multiple coil windings;
   a plurality of topographical features formed in at least one nonconfined area of the coil to increase conformal coverage area;
   a metal deposited into the at least one trench and topographical features to form an inductive structure; and
   an etch stop layer formed beneath the insulation layer, wherein the etch stop layer is resistant to reactive ion etching.

2. The inductive head structure of claim 1 wherein the coil windings are electrically isolated via planarization.

3. The inductive head structure of claim 2 wherein the planarization is via chemical mechanical polishing.

4. The inductive head structure of claim 1 wherein the trench formed in the insulation layer is formed via reactive ion etching.

5. The inductive head structure of claim 1 wherein the metal is deposited by a process that includes a low temperature chemical vapor deposition of copper.

6. The inductive head structure of claim 1 wherein the plurality of topographical features further comprise a plurality of additional trenches formed in the at least one nonconfined area of the coil to decrease the resistance in the at least one nonconfined area.

7. The inductive head structure of claim 6 wherein the plurality of additional trenches formed in the at least one nonconfined area are parallel to a coil winding, wherein the plurality of additional trenches form at least one additional inductive structure, wherein the at least one inductive structure is electrically connected to the coil.

8. The inductive head structure of claim 7 wherein the plurality of additional trenches that are parallel to a coil winding creates substantially a same pitch as found in a confined region of the coil.

9. The inductive head structure of claim 8 wherein the plurality of topographical features formed in at least one nonconfined area have a quantity of copper that is greater than a quantity of copper in the confined region.

10. The inductive head structure of claim 6 wherein different portions in the coil have different resistances.

11. The inductive head structure of claim 1 wherein the coil has an aspect ratio greater than two.

12. The inductive head structure of claim 1 wherein the trench is electrically separated in a damascene process.

13. The inductive head structure of claim 1, wherein the inductive head structure further comprises a top surface, and wherein another top surface is formed coplanar with the inductive head top surface via planarization.

14. The inductive head structure of claim 1 wherein the coil is formed coplanar with at least one portion of a magnetic pole.

15. The inductive head structure of claim 1 wherein a metal fill deposited in the nonconfined region area of the coil is accomplished via electroplating.

16. The inductive head structure of claim 1 wherein the coil is connected to external electrical devices.

17. A magnetic storage device, comprising
magnetic media for storing data thereon;
a motor for translating the position of the magnetic media; and
an actuator for positioning an inductive head structure, the inductive head structure comprising:
  an insulation layer disposed over a magnetic material;
  at least one trench formed in the insulation layer to form a coil, wherein the at least one trench forms the coil with multiple coil windings;
  a plurality of topographical features formed in at least one nonconfined area of the coil to increase conformal coverage area; and
  a metal deposited into the at least one trench and topographical features to form an inductive; and
  an etch stop layer formed beneath the insulation layer, wherein the etch stop layer is resistant to reactive ion etching.

18. The magnetic storage device of claim 17 wherein the metal is deposited by a process that includes a low temperature chemical vapor deposition of an inductive metal.

19. The magnetic storage device of claim 17 wherein the plurality of topographical features further comprise a plurality of additional trenches formed in at least one nonconfined area of the coil to decrease the resistance in the at least one nonconfined area.

20. The magnetic storage device of claim 19 wherein the plurality of additional trenches are parallel to a coil winding, wherein the plurality of additional trenches are electrically connected to the coil.

21. The magnetic storage device of claim 19 wherein the coil has a plurality of points, wherein in the plurality of points in the coil have different resistances.

22. The magnetic storage device of claim 19 wherein the plurality of additional trenches that are parallel to a coil winding creates substantially a same pitch as found in a confined region.

23. The magnetic storage device of claim 22 wherein the plurality of topographical features formed in the plurality of additional trenches formed in the at least one nonconfined area of the coil have a quantity of copper greater than a quantity of copper in the confined region of the coil.

* * * * *